United States Patent [19]
Curto

[11] 3,908,786
[45] Sept. 30, 1975

[54] STING OSCILLATOR
[75] Inventor: Paul A. Curto, Hillcrest Heights, Md.
[73] Assignee: The United States of America as represented by the Secretary of the Army, Washington, D.C.
[22] Filed: June 18, 1970
[21] Appl. No.: 47,505

[52] U.S. Cl. ............ 181/.5; 310/15; 310/36; 73/194 B; 73/194 EM
[51] Int. Cl.² ........................... H02K 35/06
[58] Field of Search......... 181/5 H, 5 AG; 102/92.4; 310/2, 15, 36; 137/81.5; 73/194 B, 194 EM, 194 A, 194 C

[56] References Cited
UNITED STATES PATENTS

| 799,305 | 9/1905 | Crouch et al. | 310/15 |
| 2,509,913 | 5/1950 | Espenschied | 290/4 |
| 2,524,826 | 10/1950 | Pajes | 310/15 |
| 2,895,063 | 7/1959 | Morris | 310/15 |
| 2,975,751 | 3/1961 | Bonne | 181/.5 H |
| 3,015,953 | 1/1962 | Peltola | 73/194 B |
| 3,123,177 | 3/1964 | Sacks | 181/.5 H |
| 3,292,727 | 12/1966 | Schorr | 181/.5 H |
| 3,376,847 | 4/1968 | Cheeseman | 181/.5 H |
| 3,415,193 | 12/1968 | Campagnuolo | 102/924 |
| 3,533,373 | 10/1970 | King | 137/81.5 |
| 3,555,314 | 1/1971 | Villarroel et al. | 310/15 |
| 3,568,704 | 3/1971 | Campagnuolo | 137/81.5 |

OTHER PUBLICATIONS
Bechwith et al., "Mechanical Measurements," 1961, pp. 99–100, Addison–Wesley Pub.

Primary Examiner—Richard A. Farley
Assistant Examiner—N. Moskowitz
Attorney, Agent, or Firm—Nathan Edelberg; Robert P. Gibson; Saul Elbaum

[57] ABSTRACT

A sting oscillator that produces sonic oscillations from a steady state fluid flow. A rigid sting is mounted concentrically within a resonant cavity in either a three-dimensional conical form or a two-dimensional wedge flow form. Fluid vortices shed from the sting cause the cavity to trigger into oscillation, creating alternating pressure waves that are dispersed in all directions. The oscillatory pressure waves can be transduced into useful electrical or mechanical power to drive any desired external device. The high pressure, large volume input flow capabilities of the sting oscillator provides power outputs heretofore unobtainable with fluidic devices. Several possible embodiments of transducers coupled with the device of the present invention are presented herein.

1 Claim, 10 Drawing Figures

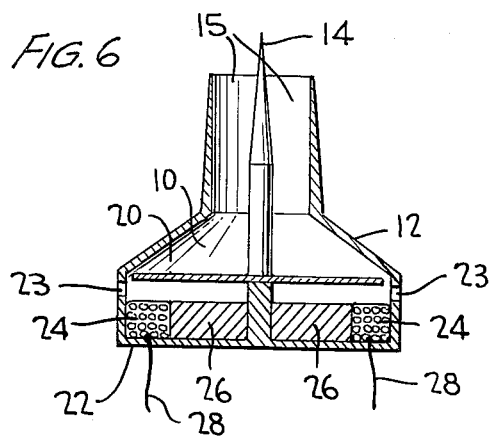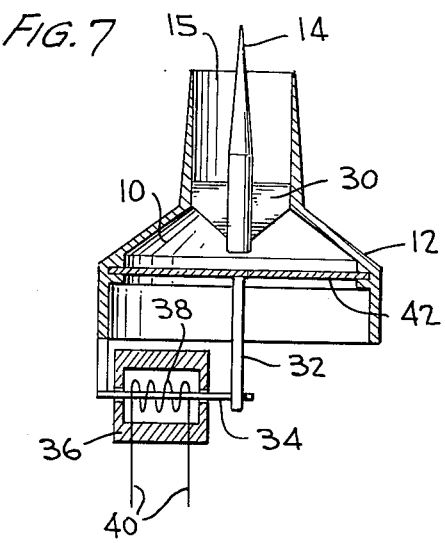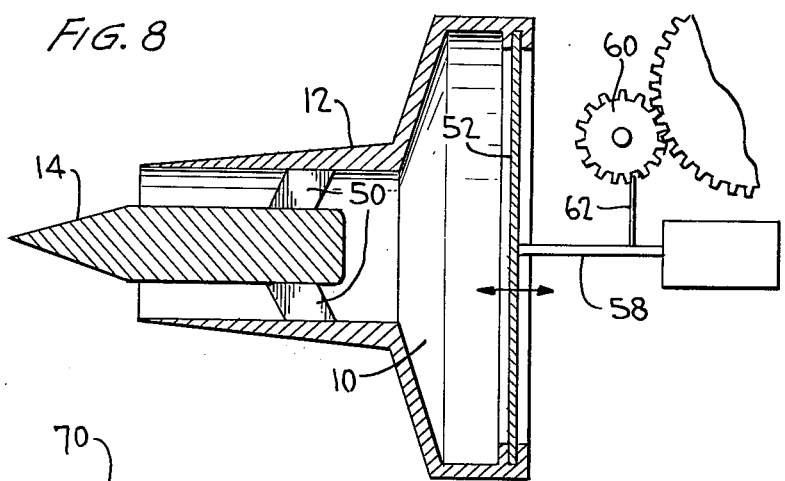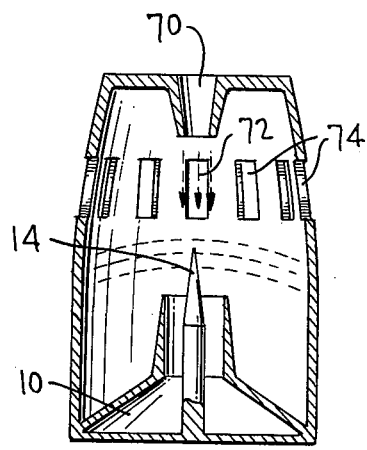

STING OSCILLATOR

RIGHTS OF GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to fluidics, and more particularly to fluid oscillators that transform a steady state fluid flow into a periodic fluid pressure wave.

2. Description of the Prior Art

Recently there have been developed a number of fluidic oscillators that transform a steady state fluid flow or a jet nozzle fluid flow into alternating fluid pressure waves. See, for example, U.S. Pat. No. 3,415,193 to Compagnuolo et al. In certain practical applications, it would be desirable to couple power from these alternating pressure waves by electrical or mechanical transducers to drive appropriate devices or mechanisms. In military applications, for example, such a fluidic generator would find wide use in the field of environmental fuzing devices, where a missile or projectile traveling through the air would utilize the environment to provide electrical or mechanical power to appropriate safety and arming devices, mechanical timers, and the like. Such a device would find wide acceptance due to its environmental ruggedness, its insensitivity to shock and vibrations, its inherent safety features, the ease of manufacture, and its lack of moving parts which would provide greater reliability than heretofore possible.

An example of such a fluidic generator can be found in U.S. Pat. application Serial No. 745,949 by Campagnuolo et al. The aforesaid application utilizes a ringtone oscillator and resonant cavity for transforming steady state fluid flow into oscillating pressure waves. The ringtone oscillator transforms the steady state fluid flow into an annular column of fluid that impinges upon the edge of the opening of a resonant cavity to produce a multiple-frequency edgetone or ringtone which causes a column of gas in the resonant cavity to vibrate in a periodic manner. The power available from the aforedescribed device is proportional to the incoming fluid flow available and is thereby limited by the close-tolerance annular orifice through which the incoming steady state fluid flows. Increasing the size of the annular orifice only results in an increased D-C fluid flow and does not increase the power output of the device.

Accordingly, the primary object of the present invention is to provide a fluidic oscillator with increased efficiency and greater power output than heretofore available.

Another object is to provide a fluidic oscillator which is of a simple design, is shock-rugged and spin-rugged, is easy to construct, and which can be triggered into oscillation by either a steady state flow or a jet nozzle fluid flow.

A further object is to provide a fluidic oscillator that can operate over a wide range of fluid velocities, can generate loud sonic noise and strong pressure waves very efficiently, and that can operate in different fluid mediums.

An additional object is to provide a fluidic oscillator that can be coupled to mechanical, electrical and acoustical transducers for driving appropriate devices and mechanisms.

A still further object of the present invention is to provide a fluidic oscillator that can be constructed in either a three-dimensional conical form or a two-dimensional wedge flow form.

Another object is to provide a fluidic oscillator that can be adapted to fuzing devices for powering safety and arming mechanisms, timing mechanisms, and the like.

SUMMARY OF THE INVENTION

Briefly, in accordance with the invention, a sting oscillator is provided for producing sonic oscillations from a steady fluid flow. The oscillator comprises a rigid rod or sting mounted concentrically within a radially-symmetric resonant cavity having an open end to receive the incoming fluid flow. Fluid vortices shed from the sting cause the cavity to trigger into oscillation, creating alternating pressure waves that can be coupled to electrical or mechanical transducers to drive external devices or mechanisms.

BRIEF DESCRIPTION OF THE DRAWINGS

The specific nature of the invention as well as other objects, aspects, uses, and advantages thereof will clearly appear from the following description and from the accompanying drawings, in which:

FIG. 6 illustrates an electro-mechanical transducer for coupling the power out from the device of the present invention;

FIG. 7 illustrates another embodiment of an electro-mechanical transducer for coupling out the power provided by the device of the present invention;

FIG. 8 illustrates another embodiment of the present invention in which a mechanical transducer is utilized as an output coupling device; and FIG. 9 illustrates the device of the present invention in a sonic oscillator embodiment.

DESCRIPTION OF THE PREFERRED EMBODIMENTS

Figure 1:
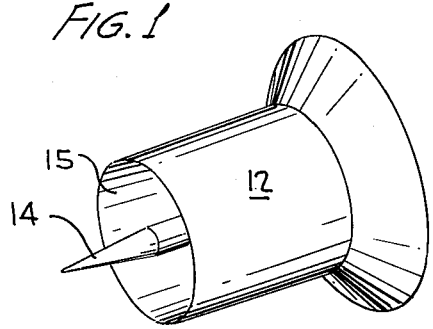
FIG. 1 is an oblique view of one embodiment of the sting-oscillator of the present invention.
Figure 2:
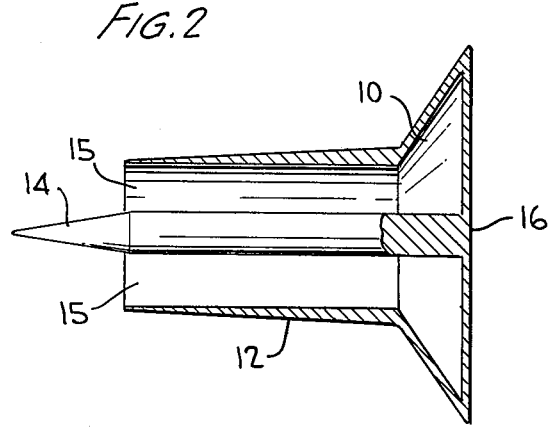
FIG. 2 is a cut-away side view showing the sting oscillator of FIG. 1.
Figure 3:
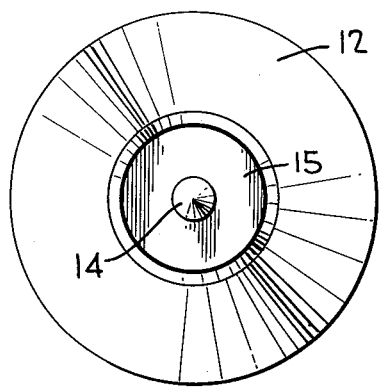
FIG. 3 is a front view showing a three-dimensional conical embodiment of the present invention.
Figure 4:
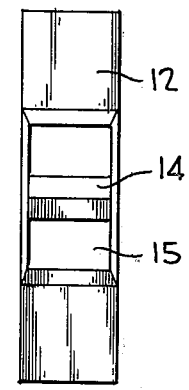
FIG. 4 is a front view showing a two-dimensional wedge flow embodiment of the present invention.

FIG. 1 illustrates an elementary oblique view of the basic sing oscillator of the present invention. The sting oscillator is a device which converts steady state fluid movement into oscillatory fluid movement, which in turn can be utilized to drive either an electrical or mechanical transducer. The device shown in FIG. 1 consists of a rigid pointed rod or sting 14, affixed along the center axis of a symmetrical resonant cavity formed by body 12. FIG. 2 shows a cut away side view of the sting oscillator of FIG. 1. It is seen in FIG. 2 that openings 15 in body 12 lead to a resonant cavity 10. Sting 14 may be base-attached at 16 as shown in FIG. 2 or may be held by ribs in the cavity as shown hereinafter. Referring now to FIG. 3, it is seen that sting 14 and body 12 may be constructed in a three-dimensional conical form or, as shown in FIG. 4, in a two-dimensional wedge-shaped form.

Figure 5A:
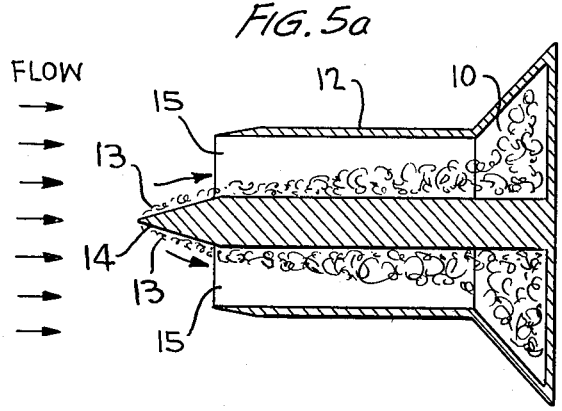
FIG. 5a illustrates the filling phase in the operation of the device of the present invention.
Figure 5B:
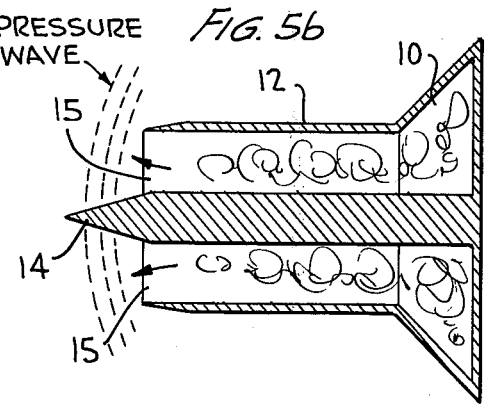
FIG. 5b illustrates the emptying phase in the operation of the device of the present invention.

FIGS. 5a and 5b illustrate the physical operation of the basic sting oscillator of FIG. 1. Sting 14 and cavity 10 formed by body 12 are placed axially or centrally in either a steady free-flow field of fluid or in the path of a jet flow as from a nozzle. FIG. 5a illustrates the filling phase of cavity 10 in which high spin fluid vortices 13 are shed by sting 14. The spinning vortices 13 as they progress into cavity 10 expand and decrease their rate of spin, converting their rotational kinetic energy into pressure. The pressure builds up with translation of the vortices, thus producing a steepening pressure wave. The pressure wave reflects off the rear wall of cavity 10 and expels from opening 15 as shown in FIG. 5b. Thus it is seen that sting 14, by causing instabilities in the flow field, changes a steady-state fluid flow into one of periodic pressure pulsation, i.e. the pressure alternately increases and decreases in cavity 10 with periodic response as long as an input flow is present.

I have discovered that an optimum operational configuration in the two-dimensional wedge-flow embodiment occurs when the ratio of the diameter of the cavity opening to the length of the protrusion of the sting beyond the opening is about 0.8. With the foregoing geometrical configuration, oscillations will occur at a frequency that is dependent upon the specific dimensions of the cavity and the external parameters. The frequency of oscillation can be expressed mathematically by $$f = \frac{a}{4\pi L} \left(\frac{p}{p_1}\right)^{1/2\gamma}$$

where
- $a$ = the speed of sound in the surrounding media;
- $L$ = the length of the cavity;
- $p$ = the free stream pressure in the surrounding media;
- $p_1$ = the pressure at the cavity entrance; and
- $\gamma$ = the specific heat constant.

The angle $\theta$ of the wedge of the sting may be varied over the range $0° < \theta < 30°$ for a specific geometry with the frequency of oscillation remaining constant independent of the incoming steady state fluid velocity. In order to achieve optimal resonance, the vortex-generating frequency of the sting, i.e. the rate at which the vortices are shed, should be a harmonic of the cavity frequency. The cavity may be of any cross-sectional shape as long as it is radially-symmetric. Since the cavity frequency is additionally a function of temperature, the pressure oscillation will likely be a function of temperature as well. The sting oscillator of FIG. 1 may thus be utilized as a temperature sensing device, or as a diaphragm driving device to obtain mechanical movement for either electro-mechanical transduction or ratchet gearing for watch movement devices or as a sonic oscillator for noise production.

Referring now to FIG. 6, we see the sting oscillator of FIG. 1 coupled to an electromechanical transducer with a modulating type metal diaphragm 20. Adjacent to diaphragn 20 is a circular permanent magnet 26 and a coil 24 that is wound around magnet 26. The base 22 is of a suitable magnetic conductor as soft iron. The alternating pressure waves created by sting 14 in cavity 10 as explained above, cause diaphragm 20 to vibrate. The vibrations of diaphragm 20 modulate the magnetic field set up by magnet 26 which, in turn, causes an emf to be generated in coil 24. The current realized therefrom can be coupled by means of wires 28 to the appropriate external circuitry. Ducts 23 are provided as air excape means for the pressure built up behind diaphragm 20. Another embodiment of an electromechanical transducer combined with the sting oscillator of the present invention is shown in FIG. 7. Here, sting 14 is rigidly attached to body 12 by means of ribs 30. Diaphragm 42 is edge clamped onto body 12 and again is forced into vibrations by the pressure oscillations. The vibrations of diaphragm 42 are transmitted to a metallic reed 34 by means of a rod 32 connected therebetween. Reed 34 is thereby caused to oscillate within a magnetic field set up by permanent magnets 36. The vibrating reed induces an emf to be set up within coil 38 that surrounds reed 34. The current thus generated can be coupled to an external electronic circuit by means of output wires 40.

FIG. 8 shows another possible embodiment using the same oscillator of the present invention in which a diaphragm is utilized with a ratchet wheel to provide mechanical movement as an output coupling device. Sting 14 is again rigidly attached to body 12 by means of ribs 50. The sting oscillator sets up pressure waves in cavity 10 that forces diaphragm 52 to vibrate. The motion of diaphragm 52 is transmitted to ratchet wheel 60 by means of a pawl 62 connected to a lever 58 which reciprocates in response to the vibrating diaphragm 52. The resultant motion imparted to ratchet wheel 60 may be used to drive any of a number of timing mechanisms, safety and arming devices, spring winders, or the like.

FIG. 9 shows the sting oscillator in a sonic oscillator embodiment in which a nozzle 70 directs a jet flow 72 of fluid to the sting 14 and resonant cavity 10 located therein. The resultant high pressure acoustic waves produces a sonic noise of very high efficiency and magnitude. Ducts 74 are provided as air escape means.

It is seen that I have provided a fluidic oscillator that utilizes a high pressure large volume flow to produce a high power output that may be coupled to electrical or mechanical transducers in a number of varied applications. The physics and geometries involved in the operation of the present invention make it clear that very large input fluid flows can be accommodated by an appropriate design, thus providing power outputs heretofore unattainable. The sting oscillator of the present invention maintains a simple concentric design, is shock-rugged and spin-rugged, is extremely easy to construct, does not require a nozzle for triggering, can be built in three-dimensional or two-dimensional form, can operate over a wide range of flight velocities, can generate very loud noise and strong pressure waves quite efficiently, and can be caused to operate in different fluid mediums. Its uncomplicated design and power increasing capabilities make it an ideal device for high power environmental energy systems.

I wish it to be understood that I do not desire to be limited to the exact details shown and described, for obvious modifications will occur to a person skilled in the art.

I claim as my invention:

1. A sting oscillator for producing sonic oscillations of a steady fluid flow, comprising:

a. a radially-symmetric enclosed volume having an open end to receive said steady fluid flow and defining a resonant cavity;

b. a rigid rod attached concentrically within said enclosed volume and having a tapered end directed outwardly from said open end of said enclosed volume for causing perturbations in said steady fluid flow, whereby fluid vortices are generated causing the pressure in said enclosed volume to alternately increase and decrease periodically;

c. a transducer for coupling out the power generated by said alternating pressure waves.

d. a metal diaphragm located within said resonant cavity so as to vibrate in response to said alternating pressure waves;

e. a circular permanent magnet located parallel and adjacent to said metal diaphragm, the vibrations of said diaphragm perturbing the magnetic field set up thereby;

f. a coil wound around said circular magnet in which an emf is induced in response to the perturbation of said magnetic field by said metal diaphragm; and g. output means connected to said coil for coupling out said emf generated therein.

* * * * *